United States Patent
Army, Jr. et al.

(10) Patent No.: US 10,112,270 B2
(45) Date of Patent: Oct. 30, 2018

(54) HEAT EXCHANGER FIN WITH CRACK ARRESTOR

(71) Applicant: Hamilton Sundstrand Corporation, Windsor Locks, CT (US)

(72) Inventors: Donald E. Army, Jr., Enfield, CT (US); George Kan, West Hartford, CT (US); Michael Spineti, Newington, CT (US); Kurt L. Stephens, Enfield, CT (US); Michael Zager, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 545 days.

(21) Appl. No.: 13/972,315

(22) Filed: Aug. 21, 2013

(65) Prior Publication Data
US 2015/0053380 A1    Feb. 26, 2015

(51) Int. Cl.
*B23P 15/26* (2006.01)
*B23H 1/00* (2006.01)
*F28F 3/02* (2006.01)
*F28D 9/00* (2006.01)

(52) U.S. Cl.
CPC .............. *B23P 15/26* (2013.01); *B23H 1/00* (2013.01); *F28D 9/0062* (2013.01); *F28F 3/025* (2013.01); *F28F 2225/06* (2013.01); *F28F 2265/26* (2013.01); *Y10T 29/4935* (2015.01)

(58) Field of Classification Search
CPC ......... F28D 9/0062; B23P 15/26; B23H 1/00; F28F 3/02

USPC .................................................. 165/170, 148
See application file for complete search history.

(56) References Cited

U.S. PATENT DOCUMENTS

| | | | | | |
|---|---|---|---|---|---|
| 2,571,631 | A | * | 10/1951 | Trumpler | F28F 3/027 165/166 |
| 2,634,958 | A | * | 4/1953 | Simpelaar | F04D 29/5826 165/165 |
| 2,656,158 | A | * | 10/1953 | Hodson | F28D 9/0018 165/166 |
| 3,517,731 | A | * | 6/1970 | Rothman | F28D 9/0062 165/166 |
| 3,601,185 | A | * | 8/1971 | Rothman | F28D 9/0062 165/166 |
| 4,107,919 | A | * | 8/1978 | Sokolowski | F28F 3/086 165/169 |

(Continued)

FOREIGN PATENT DOCUMENTS

DE    2816720 A1    10/1978
EP    1788337 A1    5/2007

(Continued)

OTHER PUBLICATIONS

European Search Report dated Mar. 27, 2015, received for corresponding European Patent Application No. 14181032.5.

*Primary Examiner* — Raheena R Malik
(74) *Attorney, Agent, or Firm* — Kinney & Lange, P.A.

(57) ABSTRACT

A method of extending the lifetime of brazed primary hot inlet wavy fin structures of aircraft heat exchangers includes inserting slots in the fins. The slots increase the mechanical compliance of the fins as well as act as crack arrestors should a thermally induced fracture occur. In an embodiment, the slots are inserted by EDM.

11 Claims, 3 Drawing Sheets

(56) References Cited

U.S. PATENT DOCUMENTS

| | | | | |
|---|---|---|---|---|
| 4,442,886 A | * | 4/1984 | Dinulescu | F28D 9/0037 165/166 |
| 4,729,428 A | * | 3/1988 | Yasutake | F28D 9/0062 165/153 |
| 4,838,041 A | * | 6/1989 | Bellows | F25B 19/005 165/80.2 |
| 5,033,540 A | * | 7/1991 | Tategami | F28D 1/0435 165/135 |
| 5,260,024 A | * | 11/1993 | Aspden | G01N 3/02 422/53 |
| 5,720,341 A | * | 2/1998 | Watanabe | F28D 1/024 165/135 |
| 6,354,368 B1 | * | 3/2002 | Nishishita | B21D 53/02 165/135 |
| 6,837,304 B2 | * | 1/2005 | Makino | F28D 1/0435 165/135 |
| 7,000,425 B2 | | 2/2006 | Army, Jr. et al. | |
| 7,188,488 B2 | | 3/2007 | Army, Jr. et al. | |
| 7,478,669 B2 | * | 1/2009 | Okura | F28D 1/0408 165/135 |
| 8,327,924 B2 | * | 12/2012 | Muley | F28F 3/02 165/135 |
| 2002/0139515 A1 | * | 10/2002 | Azar | F28F 3/02 165/80.3 |
| 2006/0157234 A1 | * | 7/2006 | Golecki | F28F 3/048 165/170 |
| 2007/0107889 A1 | * | 5/2007 | Zaffetti | F28D 9/0062 165/166 |
| 2012/0193083 A1 | * | 8/2012 | Zaffetti | F28D 9/0062 165/185 |
| 2015/0047820 A1 | * | 2/2015 | Rhoden | F28F 1/12 165/182 |

FOREIGN PATENT DOCUMENTS

| | | |
|---|---|---|
| EP | 2485005 A2 | 8/2012 |
| FR | 2066982 A1 | 8/1971 |
| GB | 1214219 A | 12/1970 |
| JP | H11153389 A | 6/1999 |

* cited by examiner

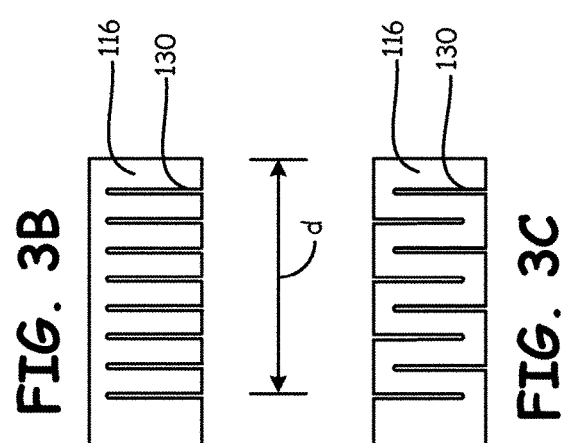
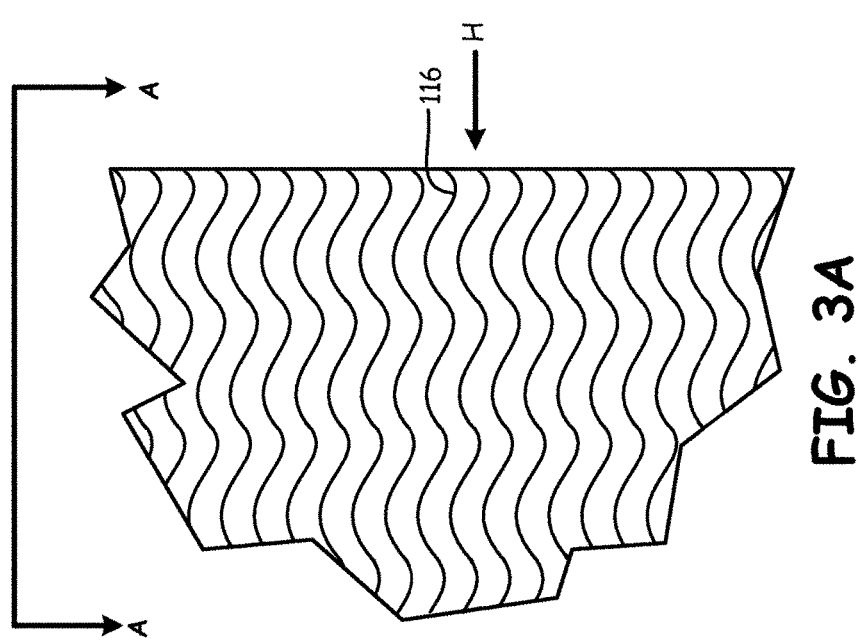

HEAT EXCHANGER FIN WITH CRACK ARRESTOR

BACKGROUND

This invention relates generally to an air generation unit (AGU) suitable for an aircraft. In particular, the invention relates to the operating lifetime of a heat exchanger in an AGU.

AGUs typically include at least one air cycle machine (ACM) and at least one heat exchanger that receives air from a pressurized air source, such as bleed air from an engine, to provide cooled air to the aircraft cabin and cockpit.

An AGU may include a heat exchanger having primary and secondary heat exchangers. Bleed air is taken from an intermediate or high pressure stage of the turbine engine. The bleed air is precooled within the primary heat exchanger with the heat being rejected to ram air and then communicated to the compressor of the ACM. After compression, the air is communicated through a secondary heat exchanger to a condenser. Condenser water vapor is extracted by a water collector, and the dehumidified air is sent to a turbine where the air is expanded to generate cold air. In larger aircraft, the AGU may include first and second turbines. The second turbine receives cold air from the first turbine and further expands the cold air to produce subfreezing air sufficient to cool larger aircraft. The cold air is sent to an environmental control system (ECS) that further conditions and distributes the air to the aircraft.

The primary heat exchanger is a component of an AGU that is susceptible to damage as a result of exposure to thermal cycling. Improvements of the primary heat exchanger will result in extended periods of service.

SUMMARY

A method of extending the lifetime of brazed primary hot inlet wavy fin structures of aircraft heat exchangers includes inserting slots in the fins. The slots increase the mechanical compliance of the fins as well as act as crack arrestors should a thermally induced fracture occur.

A brazed heat exchanger structure with an inlet and outlet for cooling a hot gas stream consists of a metal core containing closely spaced wavy metal fins to conduct heat away from the hot gas. The fins near the hot gas inlet are shaped to increase the mechanical compliance of the structure and to eliminate thermally induced crack initiation and propagation in the fins.

BRIEF DESCRIPTION OF THE DRAWINGS

FIG. 3A shows a side view of a wavy fin structure of the heat exchanger of FIG. 2 in the vicinity of a hot primary inlet. FIG. 3B shows a top view of a slotted bleed fin that is slotted on one side only. FIG. 3C shows a top view of a slotted bleed fin that is slotted on alternate sides of the fin.

DETAILED DESCRIPTION

Air generation units (AGU) of the present invention include a pressurized air source, such as a turbine engine that provides bleed air, air cycle machines (ACM) connected to the pressurized air source, primary and secondary heat exchangers that cool the air from the air source, and a system for distributing the conditioned air for the aircraft. The ACMs contain a compressor receiving the air from a primary heat exchanger to provide compressed air that is sent to a secondary heat exchanger to be cooled. The compressed air is passed through a condenser and a water collector to remove moisture from the air before being sent to a first turbine. The first turbine expands the dehumidified air to produce a first conditioned air having a first temperature. A second turbine further expands the conditioned air to produce even cooler air that is then distributed throughout the cabin and cockpit of an aircraft. This system is described in commonly owned patent U.S. Pat. No. 7,188,488 to Army, Jr. et al. and is incorporated herein by reference in its entirety.

Figure 1:
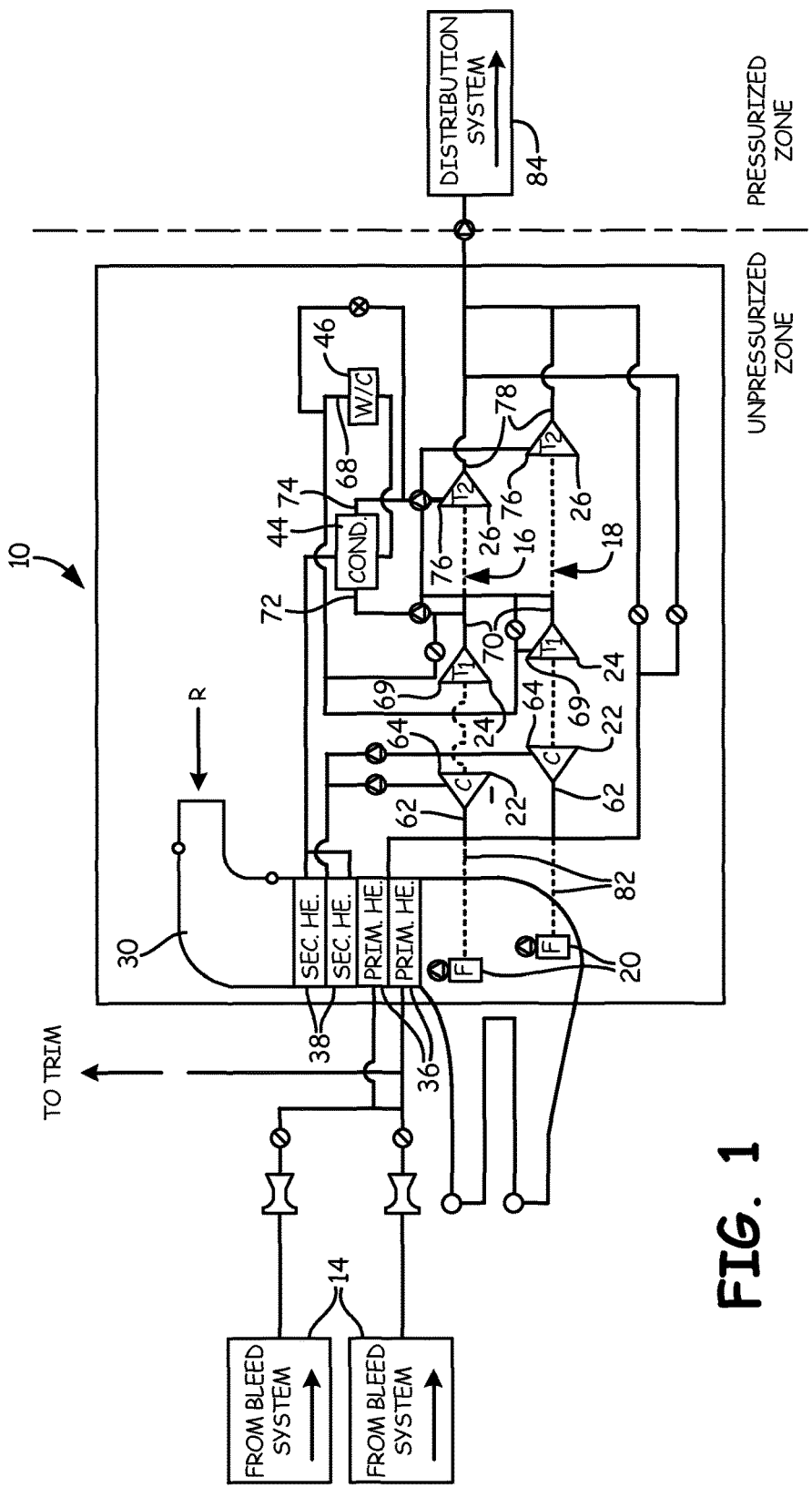
FIG. 1 is a schematic of an AGU of the present invention.

A schematic of an air generation unit (AGU) showing dual primary heat exchangers 36 of the present invention is shown in FIG. 1. AGU 10 includes first 16 and second 18 air cycle machines (ACM). ACMs 16 and 18 are in four wheel configuration including a fan 20, compressor 22, and first 24 and second 26 turbines. Shafts 82 support fans 20, compressors 22 and first and second turbines 24 and 26. Fans 20 are arranged within the ram air flow. Fans 20 pull air through heat exchangers 36 and 38 if the aircraft is not moving. FIG. 1 is an example only and the present invention can be applied to heat exchanger structures in general.

In AGU 10, ram air enters heat exchangers through header 30 along ram air flow path R wherein the heat exchangers includes dual primary 36 and dual secondary 38 heat exchangers. Primary heat exchangers 36 are air-to-air heat exchangers that cool bleed air from bleed air inlets 14 from an engine prior to being compressed by compressors 22. Secondary heat exchangers 38 cool the compressed air from compressors 22 prior to being sent to turbines 24 for expansion and further cooling. Condensers 44 in the system collect water vapor and dehumidify air from secondary heat exchangers 38.

Referring to FIG. 1, pressurized air from the engine enters from bleed air inlets 14. The high temperature bleed air passes through primary heat exchangers 36 to cool the air to a temperature that is suitable for use with aluminum components. The cooled air from primary heat exchangers 36 enters compressor inlets 62 where it is compressed by compressors 22 to provide compressed air. The temperature of the compressed air has been raised by compressors 22 such that it must be passed through secondary heat exchangers 38. The compressed air exits compressors 22 through compressor outlets 64 and passes into secondary heat exchangers 38. The cooled air from secondary heat exchangers 38 is communicated to condenser 44 to form water vapor of sufficient character to be collected by water collector 46. The dehumidified air exits water collector outlet 68 and enters inlets 69 of first turbines 24. The dehumidified air is expanded by first turbines 24 to produce a first conditioned air having a first temperature that may be as low as approximately 34° F. The conditioned air from first turbine outlets 70 is communicated through a manifold and sent to condenser 44 through condenser cold inlet 72. Condenser 44 and water collector 46 remove additional moisture from the conditioned air from first turbines 24. The further dehumidified air is communicated through a manifold through condenser cold outlet 74 into second turbine inlets 76 where the air is further expanded by second turbines 26. The conditioned air temperature produced by second turbines 26 is lower than the conditioned air temperature produced by first turbines 24. The conditioned air produced by second turbines 26 may be of sub-freezing temperatures which better enables AGU 10 to cool a large aircraft. Air from second turbine outlets 78 is sent to a distribution system in environmental control unit (ECU) 84 for cooling of the aircraft.

Figure 2:
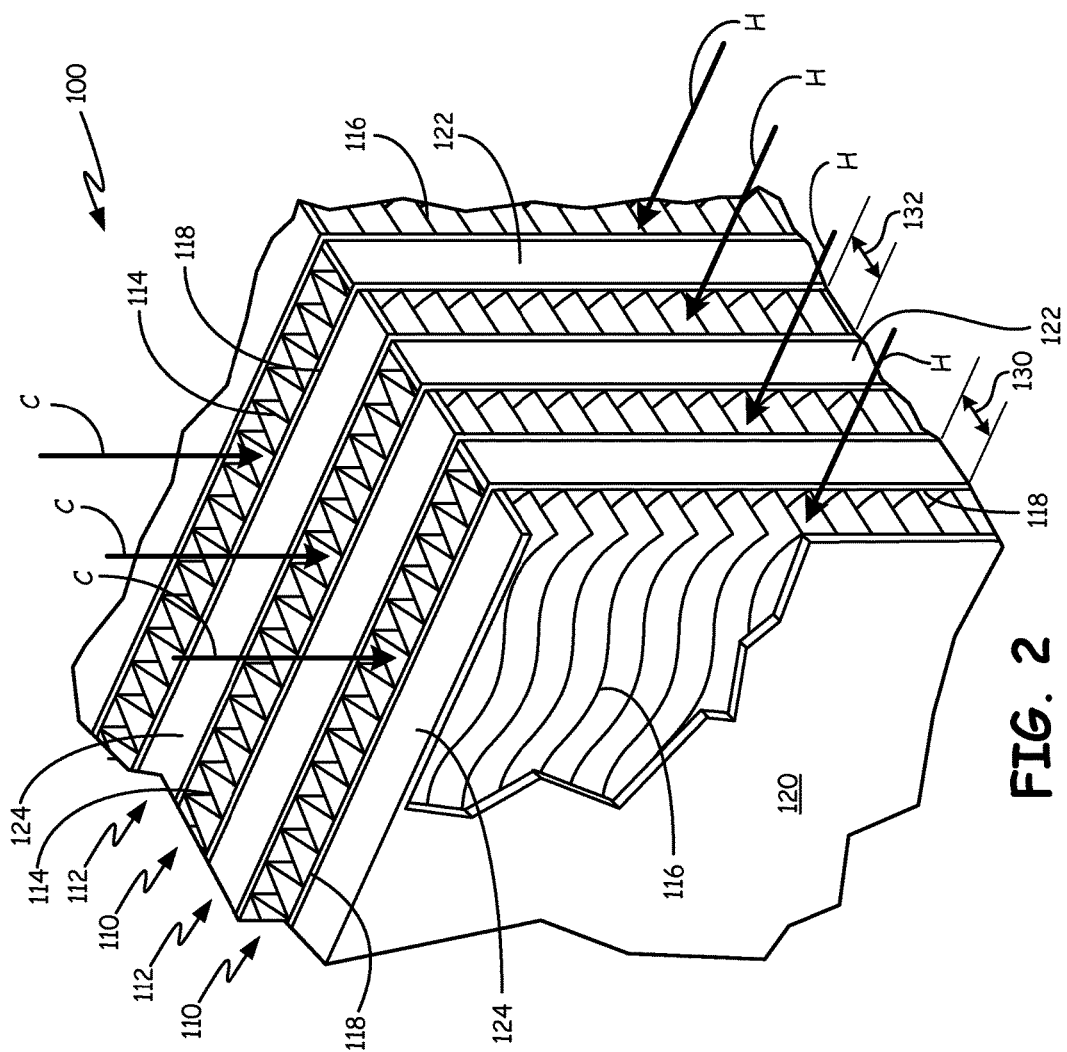
FIG. 2 is a cutaway view of a primary inlet structure of a heat exchanger for use in the AGU of FIG. 1.

A perspective cutaway view of exemplary primary heat exchanger 100 is shown in FIG. 2. Primary heat exchanger 100 is an air-to-air heat exchanger that cools hot bleed air from an engine prior to being compressed by a compressor. Primary heat exchanger 100 comprises stacked primary cold fin structures 110 and stacked primary hot bleed fin structures 112.

Primary cold fin structure 110 contains metal foil heat exchanger elements 114 in an accordion pattern that act to remove heat from adjacent hot fin structures 112 by thermal conduction. Primary hot fin structures 112 contain stacked layers of metal foil fin elements 116 in a wavy pattern to maximize contact between the wavy fins and hot bleed air passing through the primary hot fin structure.

Cold ram air from header 30 enters stacked primary cold fin structures 110 in the direction of arrows C and cools cold heat exchanger elements 114 in cold fin structures 110. Hot bleed air from an engine bleed system enters stacked primary hot fin structures 112, in the direction of arrows H and is cooled from ram air flow in stacked cold fin structures 110. Hot and cold air flow in heat exchanger 100 are perpendicular to each other as indicated in FIG. 2.

Stacked cold fin structures 110 contain metal foil heat exchanger elements 114 in an accordion pattern that act to remove heat from adjacent hot fin structures 112 by conduction. Stacked primary hot fin structures 112 contain stacked layers of metal foil fin elements 116 in a wavy pattern to maximize contact between the wavy fins and hot air passing through the primary hot fin structure. The stacked primary hot fin structures 112 and cold fin structures 110 are separated by parting sheets 118. Parting sheets 118 are also formed from metal alloys and act to support the hot and cold heat exchanger foil elements 114 and 116 in the hot and cold fin structures.

End sheets 120 form the outside barriers of primary hot heat exchanger 100. Closure bars 122 and 124 form the outside barriers of cold fin structures 110 and hot fin structures 112, respectively. The widths of closure bars 122 containing cold fin structures 110 are indicated by arrows 130. The widths of closure bars 124 containing hot fin structures 112 are indicated by arrows 132. The widths of both channels may be the same or they may be different depending on system requirements. Additional structural elements (not shown) are core bands which act to support the overall stack of hot and cold fin structures of heat exchanger 100.

The metal components of heat exchanger 100 may be any metal known in the art of heat exchanger design. In an embodiment, the metal components of an aircraft heat exchanger may be aluminum.

All internal elements of heat exchanger 100 are joined by brazing with the exception of the core bands and other mounting fixtures and mounting assemblies. During final assembly, the core bands and other mounting fixtures are typically welded to the brazed heat exchanger structure to provide support.

During operation, hot bleed air impinging on closure bars 122 of cold fin structures 110 cause the closure bars to exert forces on wavy fins 116 adjacent to the closure bars in the vicinity of the leading edge of fins 116. Various modes of system operation result in a significant variation in the heat exchanger metal temperatures and fin loading. This loading history is repeated during every flight cycle. Repeated cycling of the thermal loading process can result in fracture of the fin elements at the leading edge after relatively low numbers of flight cycles. Once fracture is initiated in a fin structure, the damage can propagate across the fin and into the heat exchanger and cause large areas of the fin structure to lose cooling capacity. As a result, the cooling efficiency of heat exchanger 100 is compromised.

It is the purpose of the present invention to introduce design changes in the bleed fin structures that decrease tensile stresses in the fin elements during thermal cycling, thereby increasing the lifetime and reliability of heat exchanger 100. Finite element analysis has shown that a more compliant fin geometry can reduce the tensile stress in a bleed fin by up to six fold thereby increasing the time for crack initiation and the resulting lifetime of the structure.

One method of increasing the bleed fin compliance in the vicinity of the entrance to the hot fin layer structure is by slotting the fins. FIGS. 3A-C show views of a hot bleed fin structure with wavy fin elements that are slotted to increase the fin compliance. FIG. 3A shows a side view of a wavy bleed fin structure in the vicinity of the hot bleed entrance. Arrow H indicates the bleed air direction. FIG. 3A shows a side view of the wavy fin structure of FIG. 2 viewed perpendicular to end face 120. FIGS. 3B and 3C are top views of the bleed fin structure of FIG. 3A showing two embodiments of the invention. In FIG. 3B, the fins are slotted on one side only. In FIG. 3C, the slots are on alternate sides of the fin. As indicated by arrow d, slots are inserted in the fins to a finite depth into the fin structure. The slot depth is from about 50 percent to about 100 percent of the fin width. The slot width is from about two times to about eight times the fin thickness. The slots are preferably inserted into the fins by electrical discharge machining (EDM).

Analysis has shown that the introduction of slots can decrease the outer fiber strain in a deformed wavy fin by about 50 percent and increase the number of cycles to failure by almost six times.

Discussion of Possible Embodiments

The following are non-exclusive descriptions of possible embodiments of the present invention.

A method of extending the lifetime of brazed fin structures of heat exchanger cores may include: providing fins with a mechanical compliance; increasing the mechanical compliance of hot and cold fins near the hot gas entry region.

The method of the preceding paragraph can optionally include, additionally and/or alternatively any, one or more of the following features, configurations and/or additional components:

Increasing the mechanical compliance may include inserting crack arrestors in the fin structure;

The crack arrestors may include slots in the fins;

The slots may be inserted on one side of the fins;

The slots may be inserted on alternating sides of the fins;

The slots may be introduced by electrical discharge machining (EDM);

The slot depth may be from about 50 percent to about 100 percent of the fin width;

The slots may be inserted into the fins to a finite depth into the heat exchanger from the hot gas entry point;

A slot width may be from about 2 times to about 8 times the fin thickness.

A brazed heat exchanger structure with an inlet and outlet for cooling a hot gas may include: an external metal duct containing closely spaced metal fins for conducting heat away from the hot gas;

The metal fins near the inlet may be shaped to increase the mechanical compliance of the structure thereby reducing thermally induced fractures in the fins during operation.

The structure of the preceding paragraph can optionally include, additionally, and/or alternatively any, one or more of the following features, configurations and/or additional components:

The fin shape may include crack arrestors machined in the hot and cold fins near the hot gas inlet;

The crack arrestors may be periodic slots in the fins.

The slots may be inserted on one side of the fins;

The slots may be inserted on alternating sides of the fins;

The slots may be introduced by electrical discharge machining (EDM).

A brazed heat exchanger structure with improved lifetime may include: stacked alternating cold fin and hot fin structures separated by parting sheets; closure bars on the ends of the hot and cold fin structures; and slotted fins in the hot fin structure near the hot air entrance that increase the fracture resistance of the fins by increasing the mechanical compliance of the structure and acting as crack arrestors.

The heat exchanger structure of the preceding paragraph can optionally include, additionally and/or alternatively any, one or more of the following features, configurations and/or additional components:

The slots may be inserted on alternating sides of the fins;

The slot depth may be about 50 percent to about 100 percent of the fin width;

The slots may be introduced by electrical discharge machining (EDM).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A brazed heat exchanger structure with thermally connected alternating perpendicular first fin structures and second fin structures separated by parting sheets, the first fin structures configured to receive gas at a cold gas inlet and the second fin structures configured to receive hot gas at a hot gas inlet and comprising:
a plurality of closely spaced metal fins in the second fin structures for conducting heat away from the hot gas, the fins each having a long direction and first and second opposite sides;
wherein the metal fins at the hot gas inlet include crack arresting slots inserted in at least one of the first and second sides of the fins only in a portion of the fins at the hot gas inlet, the crack arresting slots extending into the fins in a direction perpendicular to the long direction of the fins to increase the mechanical compliance of the second fin structures thereby reducing thermally induced fractures in the fins during operation.

2. The brazed heat exchanger structure of claim 1 wherein the crack arresting slots are inserted on only one of the first and second sides of the fins.

3. The brazed heat exchanger structure of claim 1 wherein the crack arresting slots are alternately inserted on the first and second sides of the fins.

4. The brazed heat exchanger structure of claim 1 wherein the crack arresting slots are introduced by electrical discharge machining (EDM).

5. A brazed heat exchanger structure with improved lifetime comprising:
stacked alternating perpendicular first fin structures and second fin structures separated by parting sheets;
closure bars on the ends of the first and second fin structures;
cold gas passages containing the first fin structures cooled by outside air from a cold air inlet;
hot gas passages containing the second fin structures thermally connected to the perpendicular first fin structures and heated by hot gas entering via a hot gas inlet; and
fins in the second fin structure at the hot gas inlet of the heat exchanger structure including slots only in a portion of the fins at the hot gas inlet that extend into the fins in a direction perpendicular to a long direction of the fins and increase the fracture resistance of the fins by increasing the mechanical compliance of the second fin structures and serve as crack arrestors in that portion of the fins.

6. The brazed heat exchanger structure of claim 5 wherein the slots are inserted on one side of the fins.

7. The brazed heat exchanger structure of claim 5 wherein the slots are inserted on alternating sides of the fins.

8. The brazed heat exchanger structure of claim 5 wherein the slots have a depth that is from about 50 percent to about 100 percent of the fin width.

9. The brazed heat exchanger of claim 5 wherein the slots are introduced by electrical discharge machining (EDM).

10. The brazed heat exchanger of claim 5 wherein the slots have a width that is from about two times to about eight times a thickness of the fins.

11. The brazed heat exchanger of claim 5 wherein the slots are inserted in the fins to a finite depth into the heat exchanger from the hot gas inlet.

* * * * *